United States Patent [19]

Eason

[11] Patent Number: 5,195,362
[45] Date of Patent: Mar. 23, 1993

[54] APPARATUS FOR AND METHOD OF TESTING DIESEL ENGINE HEADS FOR FUEL AND/OR COLLANT LEAKS

[75] Inventor: Preston M. Eason, Memphis, Tenn.

[73] Assignees: Jimmy R. C. Grinder; Richard Noble Grinder, Millington; George-Houston Lyell, Memphis, both of Tenn. ; part interest to each

[21] Appl. No.: 779,966

[22] Filed: Oct. 21, 1991

[51] Int. Cl.⁵ .................................................. G01M 3/26
[52] U.S. Cl. .................................... 73/49.7; 73/119 A
[58] Field of Search ...................... 73/49.7, 47, 119 A, 73/119 R, 46

[56] References Cited

U.S. PATENT DOCUMENTS

| | | | |
|---|---|---|---|
| 1,580,786 | 4/1926 | Krone . | |
| 2,328,289 | 8/1943 | Morgan . | |
| 2,342,616 | 2/1944 | O'Brien . | |
| 2,618,963 | 11/1952 | Wagenhals | 73/37 |
| 3,029,630 | 4/1962 | Cummins | 73/46 |
| 3,874,225 | 4/1975 | Fegel | 73/40 |
| 4,602,500 | 7/1986 | Kelly | 73/49.8 |

Primary Examiner—Hezron E. Williams
Assistant Examiner—Joseph W. Roskos
Attorney, Agent, or Firm—Walker, McKenzie & Walker

[57] ABSTRACT

A method and apparatus for testing an engine cylinder head for leaks regardless of whether the cylinder head is attached to an engine block. The cylinder head has a fuel injector aperture extending from a first side to a second side thereof, has a coolant passageway communicating with the fuel injector apertures between the first and second sides of the cylinder head, and has a sleeve in the fuel injector aperture to separate the fuel injector aperture from the coolant passageway. An air-tight seal is formed in the fuel injector aperture between the coolant passageway and the first side of the cylinder head. Another air-tight seal is formed in the fuel injector aperture between the coolant passageway and the second side of the cylinder head. The fuel injector aperture is then pressurized between the air-tight seals thereof. The pressure of the fuel injector aperture between the air-tight seals is then monitored over a period of time.

10 Claims, 3 Drawing Sheets

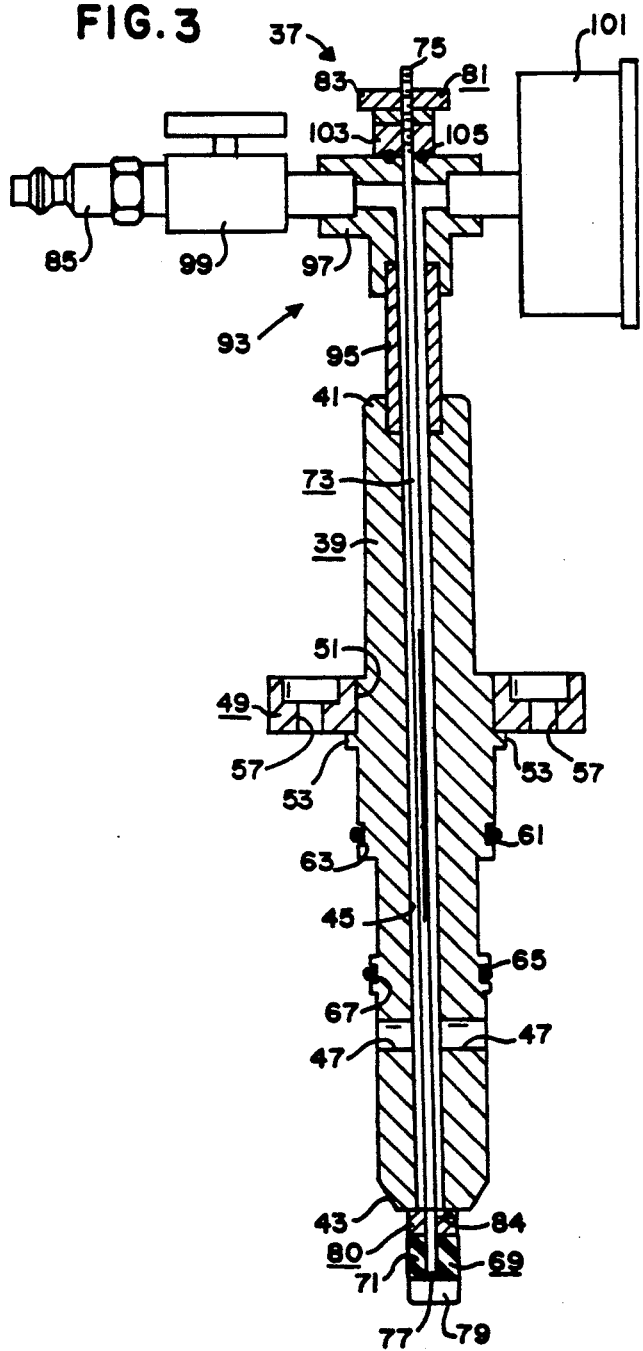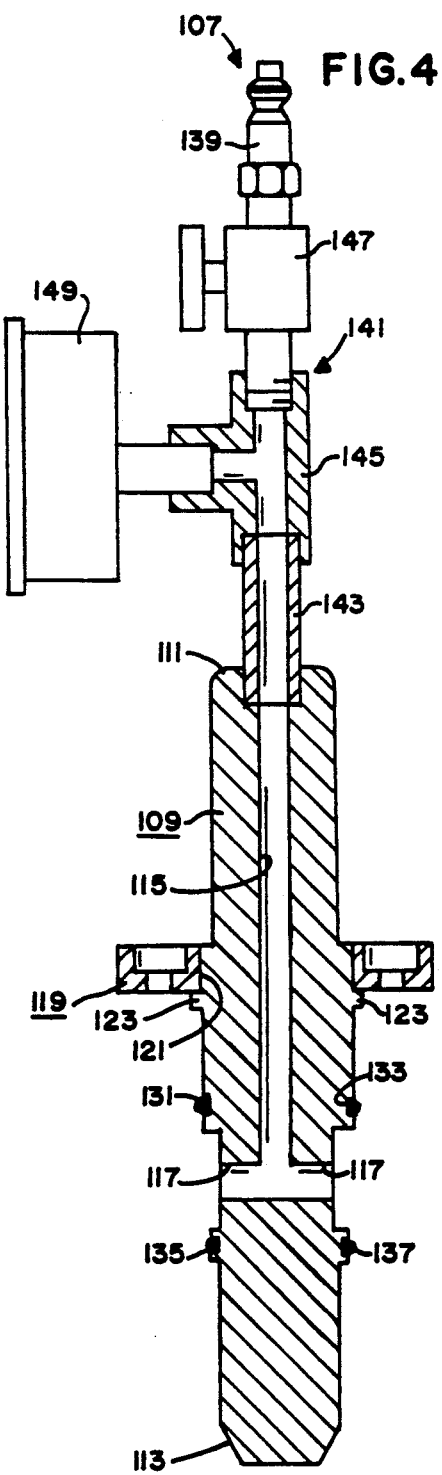

APPARATUS FOR AND METHOD OF TESTING DIESEL ENGINE HEADS FOR FUEL AND/OR COLLANT LEAKS

BACKGROUND OF THE INVENTION

1. Field of the Invention

The present invention relates, in general, to an apparatus for and a method of testing diesel engine heads for fuel and/or coolant leaks.

2. Description of the Related Art

A preliminary patentability search conducted in class 73, subclasses 46 and 47 produced Krone, U.S. Pat. No. 1,580,786, issued Apr. 13, 1926; Morgan et al., U.S. Pat. No. 2,328,289, issued Aug. 31, 1943; O'Brien, U.S. Pat. No. 2,342,616, issued Feb. 22, 1944; Wagenhals, U.S. Pat. No. 2,618,963, issued Nov. 25, 1952; Cummins, U.S. Pat. No. 3,029,630, issued Apr. 17, 1962; Fegel, U.S. Pat. No. 3,874,225, issued Apr. 1, 1975; and Kelly, U.S. Pat. No. 4,602,500, issued Jul. 29, 1986.

Krone discloses a compression tester for combustion engines. The Krone compression tester is secured upon an automobile engine block above the cylinder openings to test the compression produced within the cylinder openings by the pistons after the cylinder head has been removed.

Morgan et al. discloses an engine leakage meter for measuring leakage of gas from the cylinder of a four-stroke internal combustion engine, past the piston and valves thereof. The Morgan et al. engine leakage meter is screwed into a spark plug opening of the engine after the spark plug is removed.

O'Brien discloses a leakage testing device particularly designed for testing the tightness of joints between tubes and tube sheets embodied in steam boilers or the like. The O'Brien device includes a shank for fitting inside the tube and for forming a seal in the inside of the tube, a hollow skirt for forming a seal on the tube sheet about the end of the tube, and means for introducing fluid under pressure into the interior of the skirt and for gaging that fluid pressure.

Wagenhals discloses a machine for testing the strength of shipping tubes made of wound paper and having a slip cap adhesively secured at one end thereof. The Wagenhals machine includes a support frame, a nozzle adapted to be positioned in a shipping tube having one open end and one capped end, means for controlling the flow of air through the nozzle, and means for holding the tube against lengthwise movement.

Fegel discloses a pressure tester for the injector sleeve of diesel engine heads to determine whether the cylindrical and frusto-conical portions of the injector sleeve are in fluid-tight engagement with the walls of a fuel injector aperture in the engine head. The Fegel pressure tester includes a top tester body for being inserted into a fuel injector aperture in an engine head from the top side of the engine head; a top seal carried by the top tester body and engageable with the peripheral wall of the fuel injector aperture; a bottom tester body insertable into the fuel injector aperture from the bottom side of the engine head after the engine head has been removed from the engine block, and a bottom seal carried by the bottom tester body and engageable with the bottom of the cylinder head about the bottom of the fuel injector aperture.

Kelly discloses an apparatus for leakage testing of tubes and joints. The Kelly apparatus includes a pull bar surrounded by an array of arcuate segments having teeth that engage and deform the inner surface of a tube. When tension is applied to the pull bar, a cam forces the segments to move outwardly to contact the tube while maintaining a parallel relationship to the pull bar.

None of the above patents disclose or suggest the present invention. More specifically, none of the above patents disclose or suggest a method or means that is capable of forming an air-tight seal in a fuel injector aperture of an engine cylinder head between a coolant passageway that communicates with the fuel injector aperture and a first side of the cylinder head; forming an air-tight seal in the fuel injector aperture between the coolant passageway and a second side of the cylinder head while the cylinder head is attached to an engine block; then pressurizing the fuel injector aperture between the air-tight seals thereof; and then monitoring the pressure of the fuel injector aperture between the air-tight seals thereof over a period of time.

SUMMARY OF THE INVENTION

The present invention is directed toward providing an improved method of and apparatus for testing an engine cylinder head for leaks. The present invention includes, in general, a method of and apparatus capable of forming an air-tight seal in a fuel injector aperture of an engine cylinder head between a coolant passageway that communicates with the fuel injector aperture and a first side of the cylinder head; forming an air-tight seal in the fuel injector aperture between the coolant passageway and a second side of the cylinder head while the cylinder head is attached to an engine block; then pressurizing the fuel injector aperture between the air-tight seals thereof; and then monitoring the pressure of the fuel injector aperture between the air-tight seals thereof over a period of time.

BRIEF DESCRIPTION OF THE DRAWINGS

FIG. 3 is a sectional view of a pressure tester of the present invention for testing a cylinder head for a leak in the fuel inlet and return passageways thereof.

FIG. 4 is a sectional view of a pressure tester of the present invention for testing a cylinder head for a leak between the coolant cavities and one of the injector sleeves thereof.

DESCRIPTION OF THE PREFERRED EMBODIMENT

Figure 1:
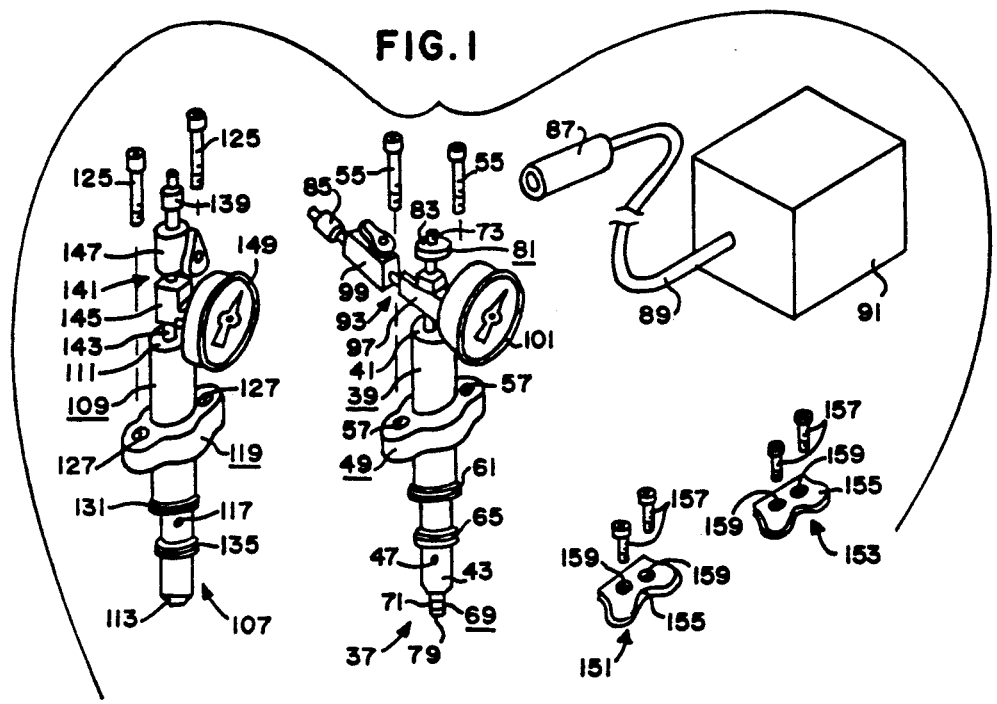
FIG. 1 is an exploded perspective view of the various combination of parts and elements that are used to provide and practice the apparatus for and a method of testing diesel engine heads for fuel and/or coolant leaks of the present invention.
Figure 2:
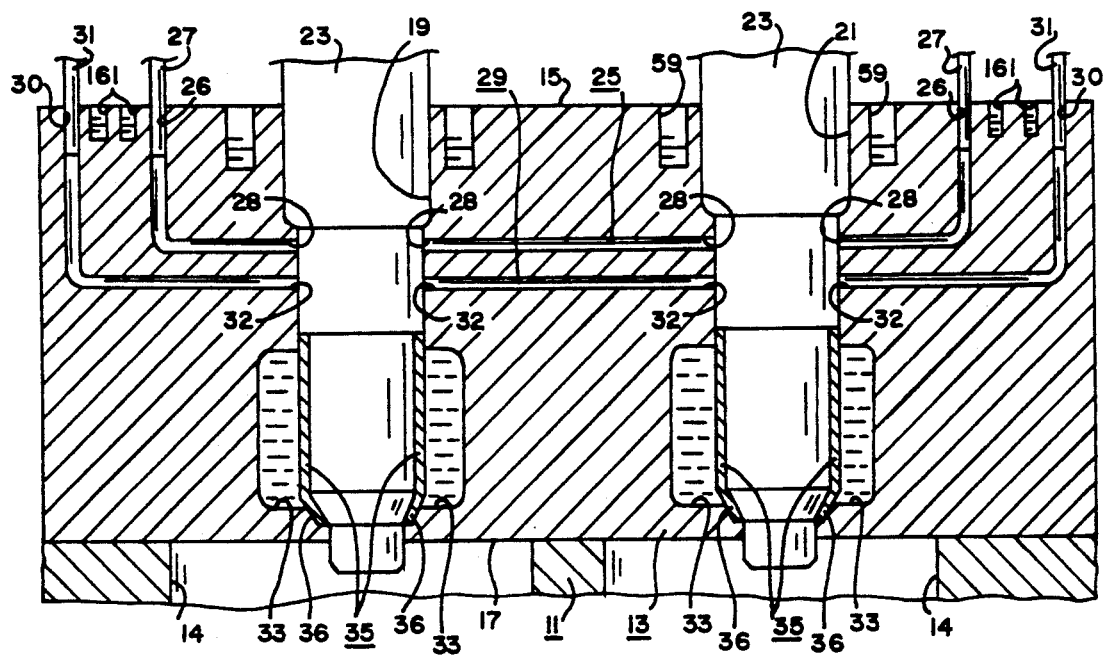
FIG. 2 is a somewhat diagrammatic sectional view of a typical diesel engine block and cylinder head, showing the fuel injectors and fuel inlet and return lines.

Portions of a typical diesel engine block and cylinder head are shown somewhat diagrammatically in FIG. 2 with the block identified by the numeral 11 and with the head identified by the numeral 13. The engine block 11 has cylinder bores 14 therein for reciprocatingly receiving pistons and the like (not shown) as will now be apparent to those skilled in the art. The cylinder head 13 has a first or top side 15, a second or bottom side 17, a first fuel injector aperture 19 extending between the first side 15 and the second side 17, and a second fuel injector aperture 21 extending between the first side 15 and the second side 17 a spaced distance from the first fuel injector aperture 19. The cylinder head 13 is designed to be bolted onto the engine block 11 with the bottom end of the first fuel injector aperture 19 communicating with the top of a first cylinder bore 14 and with the bottom end of the second fuel injector aperture 21 communicating with the top of a second cylinder bore 14. Fuel injectors 23 are mounted within each aperture 19, 21 as clearly shown in FIG. 2 for injecting diesel fuel into the respective cylinder bores 14 as will now be apparent to those skilled in the art. A fuel inlet passageway 25 communicates with each aperture 19, 21. The fuel inlet passageway 25 has external ports 26 on the exterior of the cylinder head 13 for communicating with a fuel inlet line 27 for providing fuel to each injector 23. The fuel inlet passageway 25 has internal ports 28 for communicating with the fuel injector apertures 19, 21. A fuel return passageway 29 communicates with each aperture 19, 21. The fuel return passageway 29 has external ports 30 on the exterior of the cylinder head 13 for communication with a fuel return line 31 for allowing fuel to return from each injector 23. The fuel return passageway 29 has internal ports 32 for communicating with the fuel injector apertures 19, 21. A coolant passageway or cavity 33 communicates with each aperture 19, 21 to allow coolant from the diesel engine's coolant system to prevent the injectors 23 from overheating. A tubular sleeve 35 or the like is provided in each aperture 19, 21 to separate the apertures 19, 21 from the coolant cavities 33. Each tubular sleeve 35 has a funnel-like, conical lower end 36 that coacts with a conical portion of each respective injector 23 so that force can be transmitted downward and outward through the conical portion of each respective injector 23 to press the respective sleeve 35 against the sides of the respective aperture 19, 21 to help form a seal between the respective sleeve 35 and the sides of the respective aperture 19, 21 about the coolant cavity 33. While the cylinder head 13 is typically constructed out of cast iron or the like, the sleeves 35 are preferably constructed out of copper or the like to enhance the transmission of heat therethrough as will now be apparent to those skilled in the art.

The present invention provides an apparatus for and a method of testing such cylinder heads 13 for a leak in the fuel inlet and return passageways 25, 29 and/or for a leak between the coolant cavities 33 and sleeves 35.

The apparatus of the present invention includes a pressure tester 37 for testing the cylinder head 13 for a leak between the coolant cavities 33 and one of the sleeves 35.

The pressure tester 37 includes a body member 39. The body member 39 is preferably elongated and has a first or top end 41 and a second or bottom end 43. The second end 43 is shaped and sized for being inserted into either of the apertures 19, 21 in the cylinder head 13 after the respective injector 23 has been removed. The second end 43 preferably has a conical chamfer portion or the like for coacting with the conical lower end 36 of the respective sleeve 35 to press the respective sleeve 35 against the respective aperture 19, 21 to help form a seal between the respective sleeve 35 and the coolant cavity 33 in the same manner as the conical portion of each respective injector 23 does before removal to thereby simulate the same conditions that exist when the injectors 23 are installed as will now be apparent to those skilled in the art. The chamfer portion preferably slopes at 60 degrees to transmit both downward and outward force through the respective sleeve 35 to the sides of the respective aperture 19, 21. The coaction between the conical lower end 36 of the respective sleeve 35 and the chamfer portion of the second end 43 of the body member 39 also helps to align the pressure tester 37 in the respective aperture 19, 21 for proper vertical positioning as will now be apparent to those skilled in the art. The body member 39 preferably has a central passageway 45 extending completely therethrough substantially along the longitudinal axis thereof between the first and second ends 41, 43 thereof. The body member 39 preferably has one or more outlet ports 47 that extend transverse to the central passageway 45 and communicate with the central passageway 45 to allow compressed air to pass from the central passageway 45 in a manner and for reasons as will hereinafter become apparent.

The pressure tester 37 includes a clamping bracket 49 for securely clamping the body member 39 to the cylinder head 13 with the second end 43 of the body member 39 properly positioned within one of the apertures 19, 21. The clamping bracket 49 preferably has a central aperture 51 through which the first end 41 of the body member 39 extends. The body member 39 preferably has a stop flange 53 for coacting with the clamping bracket 49 to allow the clamping bracket 49 to secure the body member 39 within the respective aperture 19, 21. A pair of bolts 55 are preferably provided for securing the clamping bracket 49 to the first side 15 of the cylinder head 13. Thus, the clamping bracket 49 preferably has a pair of apertures 57 therethrough for allowing the bolts 55 to extend therethrough into threaded apertures 59 in the first side 15 of the cylinder head 13 to thereby secure the clamping bracket 49 and the body member 39 to the cylinder head 13. As clearly shown in FIG. 5, the bottom of the clamping bracket 49 preferably does not engage the first side 15 of the cylinder head 13 when used to secure the body member 39 within the respective aperture 19, 21 to thereby insure that force is transmitted through the chamfer portion of the second end 43 of the body member 39 to the conical lower end 36 of the respective sleeve 35 to thereby help form a seal between the respective sleeve 35 and the coolant cavity 33 in the same manner as the conical portion of each respective injector 23 does before removal and to help insure proper vertical positioning of the body member 39 in the respective aperture 19, 21 as will now be apparent to those skilled in the art. Thus, the downward force created by the torque of the bolts 55 through the clamping bracket 49 against the stop flange 53 is converted into a downward and outward force at the chamfer portion of the second end 43 of the body member 39 through the respective sleeve 35 to the cylinder head 13 as will now be apparent to those skilled in the art.

The pressure tester 37 includes a first or top seal 61 for forming an air-tight seal between the circumferential wall of the respective aperture 19, 21 and the outer wall of the body member 39 at a point between first side 15 of the cylinder head 13 and the fuel inlet and return passageways 25, 29. The first seal 61 preferably consists of a typical O-ring mounted within a groove 63 about the body member 39 as will now be apparent to those skilled in the art.

The pressure tester 37 includes a second or intermediate seal 65 for forming an air-tight seal between the circumferential wall of the respective aperture 19, 21 and the outer wall of the body member 39 at a point between the fuel inlet and return passageways 25, 29 and the first or top end of the sleeve 35. The second seal 65 preferably consists of a typical O-ring mounted within a groove 67 about the body member 39 as will now be apparent to those skilled in the art.

Figure 5:
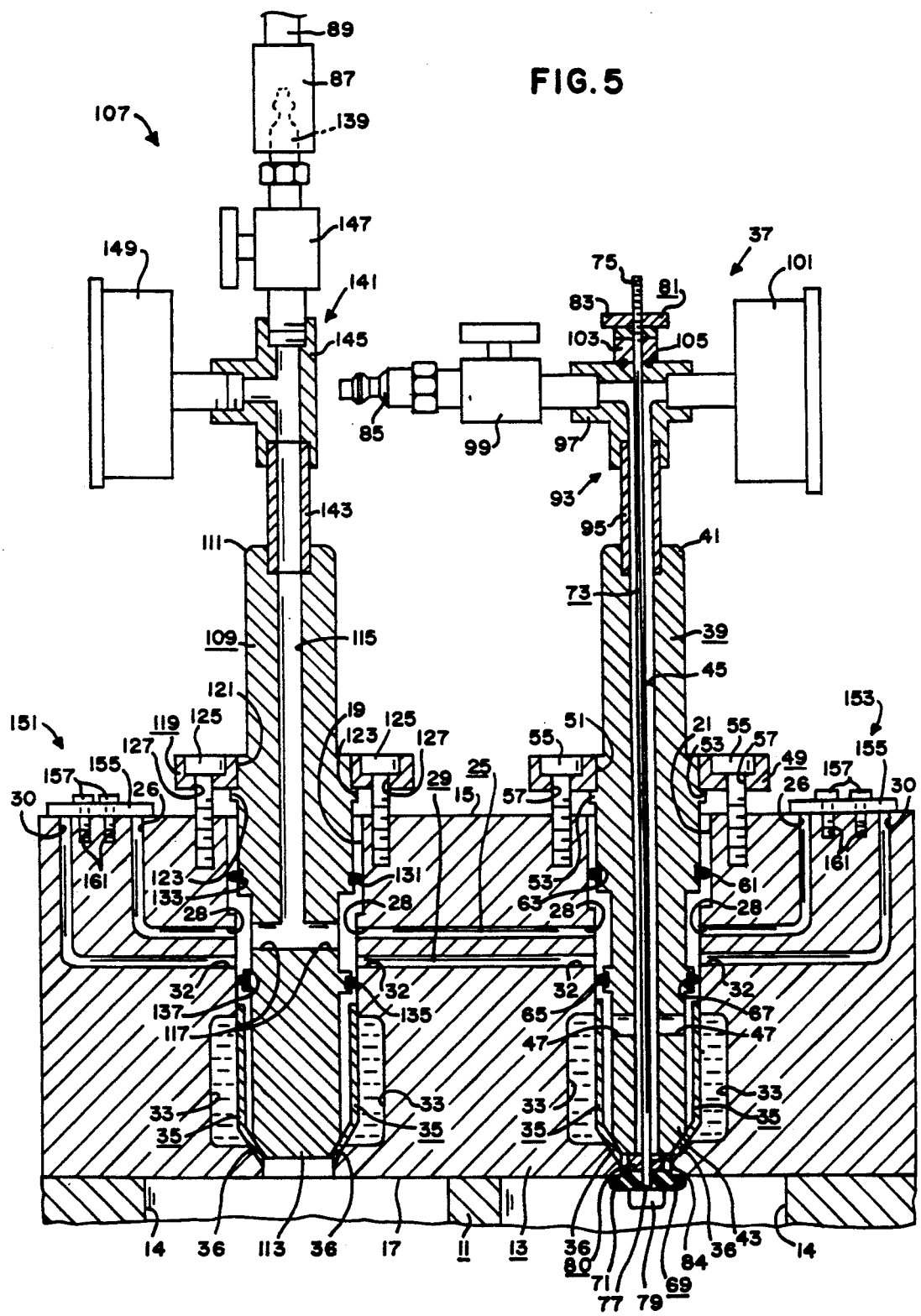
FIG. 5 is a somewhat diagrammatic sectional view similar to FIG. 2 but with the apparatus of the present invention combined therewith.

The pressure tester 37 includes a third or bottom seal 69 for forming an air-tight seal between the second or bottom end of the respective aperture 19, 21 and the body member 39 at a point below the second or bottom end of the sleeve 35. The third seal 69 preferably includes an expandable seal member 71 for movement between a normal position as shown in FIG. 3 in which no seal is formed and in which the pressure tester 37 can be easily inserted into and removed from the respective aperture 19, 21, and an expanded position as shown in FIG. 5 in which an air-tight seal is formed between the body member 39 and the cylinder head 13 as will now be apparent to those skilled in the art. The third seal 69 preferably includes a draw bar 73 for moving the expandable seal member 71 to be moved from the normal position shown in FIG. 3 to the expanded position shown in FIG. 5. The draw bar 73 preferably extends completely through the central passageway 45 in the body member 39 and preferably has a first or top end 75 for extending above the first side 15 of the cylinder head 13 and a second or bottom end 77 for extending through the expandable seal member 71 and terminating substantially at or below the second side 17 of the cylinder head 13. An enlarged head or cap 79 is provided at the second end 77 of the draw bar 73 to secure the expandable seal member 71 onto the draw bar 73 as will now be apparent to those skilled in the art. A washer-like spacer 80 is preferably provided about the shaft of the draw bar 73 between the expandable seal member 71 and the second end 43 of the body member 39 as clearly shown in FIGS. 3 and 5. A control member 81 is preferably associated with the first end 75 of the draw bar 73 for allowing an operator to move the expandable seal member 71 between the normal and expanded positions by activating the control member 81. The first end 75 of the draw bar 73 preferably has external threads thereon and the control member 81 preferably includes a hand wheel 83 having a threaded central aperture therethrough for being screwed onto the first end 75 of the draw bar 73 whereby rotation of the hand wheel 83 will cause the draw bar 73 to move back and forth in the central passageway 45 and will cause the expandable seal member 71 to move between the normal and expanded positions as will now be apparent to those skilled in the art. A groove 84 or other passageway is preferably provided in the spacer 80 for communicating with the central passageway 45 to allow compressed air to pass from the central passageway 45 in a manner and for reasons as will hereinafter become apparent.

The pressure tester 37 includes a connector member 85 for connection to coacting connector member 87 of a hose 89 or the like leading from a suitable source of compressed air such as a typical air compressor 91. A passageway means 93 is provided for coupling the connector member 85 to the first or top end of the central passageway 45 and for allowing compressed air to pass from the air compressor 91, through the hose 89, through the connector member 87, through the connector member 85, through the first or top end of the central passageway 45, out the outlet ports 47, and into a portion of the respective aperture 19, 21 between the second and third seals 65, 69 as will now be apparent to those skilled in the art. The passageway means 93 preferably includes a pipe member 95 attached to the first end 41 of the body member 39 in communication with the central passageway 45, and a hollow tee member 97 attached to the first or top end of the pipe member 95 for communicating through the pipe member 95 with the central passageway 45. A valve 99 is preferably connected to the tee member 97 and the connector member 85 for allowing compressed air to pass from the connector member 85 to the central passageway 45 when the valve is opened.

An air pressure gauge 101 is preferably attached to the tee member 97 for communicating through the tee member 97 and pipe member 95 with the central passageway 45 and for indicating the air pressure within the central passageway 45 as will now be apparent to those skilled in the art.

The first end 75 of the draw bar 73 preferably extends through the pipe member 95 and the tee member 97. A thrust washer 103 or the like is preferably provided between the tee member 97 and the hand wheel 83 and a seal such as a typical O-ring 105 is preferably provided to insure an air-tight connection between the draw bar 73, thrust washer 103 and tee member 97 as will now be apparent to those skilled in the art.

The apparatus of the present invention includes a pressure tester 107 for testing the cylinder head 13 for a leak in the fuel inlet and return passageways 25, 29.

The pressure tester 107 includes a body member 109. The body member 109 is preferably elongated and has a first or top end 111 and a second or bottom end 113. The second end 113 is shaped and sized for being inserted into either of the apertures 19, 21 in the cylinder head 13 after the respective injector 23 has been removed. The second end 113 preferably has a conical chamfer portion or the like for coacting with the conical lower end 36 of the respective sleeve 35 to press the respective sleeve 35 against the respective aperture 19, 21 and to help align the pressure tester 107 in the respective aperture 19, 21 for proper vertical positioning as will now be apparent to those skilled in the art. The body member 109 preferably has a central passageway 115 extending from the first end 111 thereof partially toward the second end 113 thereof substantially along the longitudinal axis thereof. The body member 109 preferably has one or more outlet ports 117 that extend transverse to the central passageway 115 and communicate with the central passageway 115 to allow compressed air to pass from the central passageway 115 in a manner and for reasons as will hereinafter become apparent.

The pressure tester 107 includes a clamping bracket 119 for securely clamping the body member 109 to the cylinder head 13 with the second end 113 of the body member 109 properly positioned within one of the apertures 19, 21. The clamping bracket 119 preferably has a central aperture 121 through which the first end 111 of the body member 109 extends. The body member 109 preferably has a stop flange 123 for coacting with the clamping bracket 119 to allow the clamping bracket 119 to secure the body member 109 within the respective aperture 19, 21. A pair of bolts 125 is preferably provided for securing the clamping bracket 119 to the first side 15 of the cylinder head 13. Thus, the clamping bracket 119 preferably has a pair of apertures 127 therethrough for allowing the bolts 125 to extend therethrough into the threaded apertures 59 in the first side 15 of the cylinder head 13 to thereby secure the clamping bracket 119 and the body member 109 to the cylinder head 13. As clearly shown in FIG. 5, the bottom of the clamping bracket 119 preferably does not engage the first side 15 of the cylinder head 13 when used to secure the body member 109 within the respective aperture 19, 21 to thereby insure that force is transmitted through the chamfer portion of the second end 113 of the body member 109 to the conical lower end 36 of the respective sleeve 35 to thereby help insure proper vertical positioning of the body member 109 in the respective aperture 19, 21 as will now be apparent to those skilled in the art.

The pressure tester 107 includes a first or top seal 131 for forming an air-tight seal between the circumferential wall of the respective aperture 19, 21 and the outer wall of the body member 109 at a point between first side 15 of the cylinder head 13 and the fuel inlet and return passageways 25, 29. The first seal 131 preferably consists of a typical O-ring mounted within a groove 133 about the body member 109 as will now be apparent to those skilled in the art.

The pressure tester 107 includes a second or bottom seal 135 for forming an air-tight seal between the circumferential wall of the respective aperture 19, 21 and the outer wall of the body member 109 at a point between the fuel inlet and return passageways 25, 29 and the first or top end of the sleeve 35. The second seal 135 preferably consists of a typical O-ring mounted within a groove 137 about the body member 109 as will now be apparent to those skilled in the art.

The pressure tester 107 includes a connector member 139 for connection to the coacting connector member 87 of the hose 89 or the like leading from the air compressor 91 or the like. A passageway means 141 is provided for coupling the connector member 139 to the first or top end of the central passageway 115 and for allowing compressed air to pass from the air compressor 91, through the hose 89, through the connector member 87, through the connector member 139, through the first or top end of the central passageway 115, out the outlet ports 117, and into a portion of the respective aperture 19, 21 between the first and second seals 131, 135 as will now be apparent to those skilled in the art. The passageway means 141 preferably includes a pipe member 143 attached to the first end 111 of the body member 109 in communication with the central passageway 115, and a hollow tee member 145 attached to the first or top end of the pipe member 143 for communicating through the pipe member 143 with the central passageway 115. A valve 147 is preferably connected to the tee member 145 and the connector member 139 for allowing compressed air to pass from the connector member 139 to the central passageway 115 when the valve is opened.

An air pressure gauge 149 is preferably attached to the tee member 145 for communicating through the tee member 145 and pipe member 143 with the central passageway 115 and for indicating the air pressure within the central passageway 115 as will now be apparent to those skilled in the art.

The apparatus of the present invention preferably includes blockage means for blocking the inlet and outlet ports of the fuel inlet and return passageways 25, 29. More specifically, the apparatus of the present invention preferably includes a first blockage means 151 for blocking one end of the fuel inlet and return passageways 25, 29 after the respective fuel inlet and return lines 27, 31 have been removed therefrom; and preferably includes a second blockage means 153 for blocking the other end of the fuel inlet and return passageways 25, 29 after the respective fuel inlet and return lines 27, 31 have been removed therefrom. Each blockage means 151, 153 preferably includes a plate member 155 for being placed over and blocking the openings of the respective end of the fuel inlet and return passageways 25, 29 after the respective fuel inlet and return lines 27, 31 have been removed therefrom. Each blockage means 151, 153 preferably includes a pair of bolts 157 for securing the respective plate member 155 to the cylinder head 13 over the respective end of the fuel inlet and return passageways 25, 29 after the respective fuel inlet and return lines 27, 31 have been removed therefrom. Thus, each plate member 155 preferably has a pair of apertures 159 therethrough for allowing the bolts 157 to extend therethrough into threaded apertures 161 in the cylinder head 13 to thereby secure the plate members 155 to the cylinder head 13 in an air-tight manner.

The preferred embodiment of the method of the present invention consists of first testing the cylinder head 13 for a leak in the fuel inlet and return passageways 25, 29 and then testing the cylinder head 13 for a leak between the coolant cavities 33 and sleeves 35.

To perform the preferred embodiment of the method of the present invention for testing the cylinder head 13 for a leak in the fuel inlet and return passageways 25, 29, the injectors 23 and the fuel inlet and return lines 27, 31 are removed from the cylinder head 13. The plate members 155 of the first and second blockage means 151, 153 are then attached to the cylinder head 13 to form an air-tight seal at the opposite ends of the fuel inlet and return passageways 25, 29. The pressure tester 37 is inserted into either of the apertures 19, 21, and clamped into place with the clamping bracket 49 to form an air-tight seal between the circumferential wall of the respective aperture 19, 21 and the first and second seals 61, 65 with the first seal 61 located above the fuel inlet and return passageways 25, 29 and with the second seal 65 located below the fuel inlet and return passageways 25, 29, and to force the chamfer portion of the second end 43 of the body member 39 against the conical lower end 36 of the respective sleeve 35 to thereby help align and vertically position the pressure tester 37 in the respective aperture 19, 21. The O-rings forming the seals 61, 65 should be lightly greased before the pressure tester 37 is inserted into the respective aperture 19, 21. The bolts 55 should be torqued to 12-14 foot pounds. The pressure tester 107 is inserted into the other aperture 19, 21, and clamped into place with the clamping bracket 119 to form an air-tight seal between the circumferential wall of the respective aperture 19, 21 and the first and second seals 131, 135 with the first seal 131 located above the fuel inlet and return passageways 25, 29 and with the second seal 135 located below the fuel inlet and return passageways 25, 29, and to force the chamfer portion of the second end 113 of the body member 109 against the conical lower end 36 of the respective sleeve 35 to thereby help align and vertically position the pressure tester 107 in the respective aperture 19, 21. The O-rings forming the seals 131, 135 should be lightly greased before the pressure tester 107 is inserted into the respective aperture 19, 21. The bolts 125 should be torqued to 12-14 foot pounds. The valve 147 is then closed and the connector member 87 attached to the connector member 139. The valve 147 is subsequently opened and the air compressor 91 activated to pressurize the fuel inlet and return passageways 25, 29 to 100 pounds per square inch (psi). The valve 147 is then closed and the air pressure indicated by the air pressure gauge 149 is monitored for two minutes. If the pressure drops more than 20 psi in two minutes, a soap solution (i.e., a soap and water mixture) is applied to all fittings as will now be apparent to those skilled in the art. The fuel inlet and return passageways 25, 29 are again pressurized to 100 psi, the valve 147 closed, and the air pressure indicated by the air pressure gauge 149 monitored for two minutes. If the pressure again drops more than 20 psi in two minutes and no leak is noted from any fitting, the cylinder head 13 has failed the test and has a leak in the fuel inlet and/or return passageways 25, 29.

To perform the preferred embodiment of the method of the present invention for testing the cylinder head 13 for a leak between the coolant cavities 33 and sleeves 35, the injectors 23 are removed from the cylinder head 13. However, since the cylinder head 13 is normally tested for a leak between the coolant cavities 33 and the sleeves 35 after it has been tested for a leak in the fuel inlet and return passageways 25, 29, the injectors are normally already removed. In this case, the pressure tester 107 can be removed from the respective aperture 19, 21. On the other hand, if the cylinder head 13 is only being tested for a leak between the coolant cavities 33 and sleeves 35, etc., then the injectors 23 are removed and the pressure tester 37 is inserted into either of the apertures 19, 21, and clamped into place with the clamping bracket 49 to form an air-tight seal between the circumferential wall of the respective aperture 19, 21 and the first and second seals 61, 65 with the first seal 61 located above the fuel inlet and return passageways 25, 29 and with the second seal 65 located below the fuel inlet and return passageways 25, 29, and to force the chamfer portion of the second end 43 of the body member 39 against the conical lower end 36 of the respective sleeve 35 to thereby help form a seal between the respective sleeve 35 and the sides of the respective aperture 19, 21 about the coolant cavity 33 and to thereby simulate the same conditions that exist when the fuel injectors 23 are in place. The O-rings forming the seals 61, 65 should be lightly greased before the pressure tester 37 is inserted into the respective aperture 19, 21. The bolts 55 should be torqued to 12-14 foot pounds. The hand wheel 83 is turned to cause the expandable seal member 71 to move to the expanded position and form an air-tight seal between the second or bottom end of the respective aperture 19, 21 and the body member 39 at a point below the second or bottom end of the sleeve 35. The hand wheel 83 is turned "finger tight" and care should be taken not to over-tighten the hand wheel 83. The valve 99 is closed and the connector member 87 attached to the connector member 85. The valve 99 is subsequently opened and the air compressor 91 activated to pressurize the area in the respective aperture 19, 21 between the second seal 65 and third seal 69 to 40 pounds per square inch (psi). Thus, compressed air will pass from the central passageway 45 through the outlet ports 47 to the area in the respective aperture 19, 21 between the second seal 65 and the point where the chamfer portion of the second end 43 of the body member 39 is forced against the conical lower end 36 of the respective sleeve 35, and will pass from the central passageway 45 through the groove 84 to the area in the respective aperture 19, 21 between the third seal 69 and the point where the chamfer portion of the second end 43 of the body member 39 is forced against the conical lower end 36 of the respective sleeve 35 as will now be apparent to those skilled in the art. The valve 99 is then closed and the air pressure indicated by the air pressure gauge 101 is monitored for one minute. If the pressure has dropped more than 10 psi after one minute, a soap solution (i.e., a soap and water mixture) is applied to all fittings as will now be apparent to those skilled in the art. The area in the respective aperture 19, 21 between the second seal 65 and third seal 69 is again pressurized to 40 pounds per square inch (psi), the valve 99 closed, and the air pressure indicated by the air pressure gauge 101 monitored for one minute. If the pressure again drops more than 10 psi in one minute and no leak is noted from any fitting, the cylinder head 13 has failed the test and has a leak between the coolant cavities 33 and the sleeve 35 of the respective aperture 19, 21. The pressure tester 37 is then removed from the respective aperture 19, 21 and inserted into the other aperture 19, 21 and the above procedures repeated to test that respective aperture 19, 21 for a leak between the coolant cavities 33 and the sleeve 35 of that respective aperture 19, 21.

Although the present invention has been described and illustrated with respect to a preferred embodiment and a preferred use therefor, it is not to be so limited since modifications and changes can be made therein which are within the full intended scope of the invention.

I claim:

1. A method for testing an engine cylinder head for leaks regardless of whether said cylinder head is attached to an engine block, said cylinder head having a fuel injector aperture extending from a first side to a second side thereof, having a coolant passageway communicating with said fuel injector apertures between said first and second sides of said cylinder head, and having a sleeve in said fuel injector aperture to separate said fuel injector aperture from said coolant passageway; said method comprising the steps of:
   a) forming an air-tight seal in said fuel injector aperture between said coolant passageway and said first side of said cylinder head;
   b) forming an air-tight seal in said aperture between said coolant passageway and said second side of said cylinder head;
   c) then pressurizing said fuel injector aperture between said air-tight seals thereof; and
   d) then monitoring the pressure of said fuel injector aperture between said air-tight seals thereof over a period of time.

2. The method of claim 1 in which said cylinder head has a second fuel injector aperture extending from said first side to said second side thereof; in which said coolant passageway communicates with said second fuel injector aperture; in which said cylinder head has a sleeve in said second fuel injector aperture to separate said second fuel injector aperture from said coolant passageway; and in which said method includes the additional steps of then:
   a) forming an air-tight seal in said second fuel injector aperture between said coolant passageway and said first side of said cylinder head;
   b) forming an air-tight seal in said second fuel injector aperture between said coolant passageway and said second side of said cylinder head;
   c) then pressurizing said second fuel injector aperture between said air-tight seals thereof; and d) then monitoring the pressure of said second fuel injector aperture between said air-tight seals thereof over a period of time.

3. The method of claim 1 in which is included the step of forcing said sleeve downward and outward against the sides of said fuel injector aperture before pressurizing said fuel injector aperture between said air-tight seals thereof.

4. A method for testing an engine cylinder head for leaks regardless of whether said cylinder head is attached to an engine block, said cylinder head having first and second fuel injector apertures extending from a first side to a second side thereof, having a fuel passageway communicating with each of said fuel injector apertures, having a coolant passageway communicating with each of said fuel injector apertures at a point between said fuel passageway and said second side of said cylinder head, and having a tubular sleeve in each of said fuel injector apertures to separate said fuel injector apertures from said coolant passageway; said method comprising the steps of:
   a) forming a first air-tight seal in said first fuel injector aperture between said fuel passageway and said first side of said cylinder head;
   b) forming a second air-tight seal in said first fuel injector aperture between said fuel passageway and coolant passageway;
   c) forming a first air-tight seal in said second fuel injector aperture between said fuel passageway and said first side of said cylinder head;
   d) forming a second air-tight seal in said second fuel injector aperture between said fuel passageway and coolant passageway;
   e) then pressurizing said fuel passageway;
   f) then monitoring the pressure of said fuel passageway over a period of time;
   g) forming a third air-tight seal in said first fuel injector aperture between said coolant passageway and said second side of said cylinder head;
   h) then pressurizing said first fuel injector aperture between said second and third air-tight seals thereof;
   i) then monitoring the pressure of said first fuel injector aperture between said second and third air-tight seals thereof over a period of time;
   j) forming a third air-tight seal in said second fuel injector aperture between said coolant passageway and said second side of said cylinder head;
   k) then pressurizing said second fuel injector aperture between said second and third air-tight seals thereof; and
   l) then monitoring the pressure of said second fuel injector aperture between said second and third air-tight seals thereof over a period of time.

5. The method of claim 4 in which said fuel passageway has external ports on the exterior of said cylinder head, and in which said method includes the step of forming air-tight seals about said external ports of said fuel passageway before pressurizing said fuel passageway.

6. An apparatus for testing an engine cylinder head for leaks regardless of whether said cylinder head is attached to an engine block, said cylinder head having a fuel injector aperture extending from a first side to a second side thereof, having a coolant passageway communicating with said fuel injector aperture between said first and second sides of said cylinder head, and having a sleeve in said fuel injector aperture to separate said fuel injector aperture from said coolant passageway; said apparatus comprising:
   a) means for forming an air-tight seal in said fuel injector aperture between said coolant passageway and said first side of said cylinder head;
   b) means for forming an air-tight seal in said fuel injector aperture between said coolant passageway and said second side of said cylinder head;
   c) means for allowing said fuel injector aperture between said air-tight seals thereof to be pressurized; and
   d) means for monitoring the pressure of said fuel injector aperture between said air-tight seals thereof over a period of time.

7. The apparatus of claim 6 in which is included means for forcing said sleeve downward and outward against the sides of said fuel injector aperture before pressurizing said fuel injector aperture between said air-tight seals thereof.

8. An apparatus for testing an engine cylinder head for leaks regardless of whether said cylinder head is attached to an engine block, said cylinder head having a fuel injector aperture extending from a first side to a second side thereof, having a coolant passageway communicating with said fuel injector apertures between said first and second sides of said cylinder head, and having a sleeve in said fuel injector aperture to separate said fuel injector aperture from said coolant passageway; said apparatus comprising:
   a) a body member for being inserted into said fuel injector aperture of said cylinder head;
   b) seal means on said body member for forming an air-tight seal in said fuel injector aperture between said coolant passageway and said first side of said cylinder head;
   c) seal means on said body member for forming an air-tight seal in said fuel injector aperture between said coolant passageway and said second side of said cylinder head;
   d) passageway means in said body member for allowing pressurized air to pass through said body member to said fuel injector aperture between said air-tight seals formed by said seal means; and
   e) air pressure monitor means coupled to said passageway means in said body member for monitoring the air pressure in said fuel injector aperture between said air-tight seals formed by said seal means over a period of time.

9. An apparatus for testing an engine cylinder head for leaks regardless of whether said cylinder head is attached to an engine block, said cylinder head having a fuel injector aperture extending from a first side to a second side thereof, having a fuel passageway communicating with said fuel injector aperture, having a coolant passageway communicating with said fuel injector apertures between said fuel passageway and said second side of said cylinder head, and having a sleeve in said fuel injector aperture to separate said fuel injector aperture from said coolant passageway; said apparatus comprising:
   a) a body member for being inserted into said fuel injector aperture of said cylinder head;
   b) first seal means on said body member for forming an air-tight seal in said fuel injector aperture between said fuel passageway and said first side of said cylinder head;
   c) second seal means on said body member for forming an air-tight seal in said fuel injector aperture between said fuel passageway and said coolant passageway of said cylinder head;

d) third seal means on said body member for forming an air-tight seal in said fuel injector aperture between said coolant passageway and said second side of said cylinder head;

e) passageway means in said body member for allowing pressurized air to pass through said body member to said fuel injector aperture between said air-tight seals formed by said second and third seal means; and d) air pressure monitor means coupled to said passageway means in said body member for monitoring the air pressure in said fuel injector aperture between said air-tight seals formed by said second and third seal means over a period of time.

10. An apparatus for testing an engine cylinder head for leaks regardless of whether said cylinder head is attached to an engine block, said cylinder head having first and second fuel injector apertures extending from a first side to a second side thereof, having a fuel passageway communicating with each of said fuel injector apertures, having a coolant passageway communicating with each of said fuel injector apertures between said fuel passageway and said second side of said cylinder head, and having a sleeve in each of said fuel injector apertures to separate each of said fuel injector apertures from said coolant passageway; said apparatus comprising:

a) a first body member for being inserted into said first fuel injector aperture of said cylinder head;

b) first seal means on said first member for forming an air-tight seal in said first fuel injector aperture between said fuel passageway and said first side of said cylinder head;

c) second seal means on said first body member for forming an air-tight seal in said first fuel injector aperture between said fuel passageway and said coolant passageway of said cylinder head;

d) third seal means on said first body member for forming an air-tight seal in said first fuel injector aperture between said coolant passageway and said second side of said cylinder head;

e) passageway means in said first body member for allowing pressurized air to pass through said first body member to said first fuel injector aperture between said air-tight seals formed by said second and third seal means on said first body member;

f) air pressure monitor means coupled to said passageway means in said first body member for monitoring the air pressure in said first fuel injector aperture between said air-tight seals formed by said second and third seal means on said first body member over a period of time;

g) a second body member for being inserted into said second fuel injector aperture of said cylinder head;

h) first seal means on said second body member for forming an air-tight seal in said second fuel injector aperture between said fuel passageway and said first side of said cylinder head;

i) second seal means on said second body member for forming an air-tight seal in said second fuel injector aperture between said fuel passageway and said coolant passageway;

j) passageway means in said second body member for allowing pressurized air to pass through said second body member to said second fuel injector aperture between said air-tight seals formed by said first and second seal means on said second body member; and k) air pressure monitor means coupled to said passageway means in said second body member for monitoring the air pressure in said fuel injector aperture between said air tight seals formed by said first and second seal means on said second body member.

* * * * *